United States Patent [19]

Lin

[11] 4,157,798

[45] Jun. 12, 1979

[54] FOLDABLE SUPPORT FOR MACHINE TOOL

[76] Inventor: Chung-Jeno Lin, 2nd Floor, No. 7-2, Lane 27, Sec. 2, Chung Shan North Rd., Taipei, Taiwan

[21] Appl. No.: 858,348

[22] Filed: Dec. 7, 1977

[51] Int. Cl.$^2$ .......... F16F 15/00

[52] U.S. Cl. .......... 248/647; 108/115; 248/166

[58] Field of Search .......... 248/166, 439, 13; 108/115, 125, 127, 134, 128; 182/153, 155; 280/79.1 R, 79.1 A, 79.3, 79.2

[56] References Cited

U.S. PATENT DOCUMENTS

| | | | |
|---|---|---|---|
| 1,179,623 | 4/1916 | Gerrish | 248/166 |
| 1,435,738 | 11/1922 | Reiman | 248/166 |
| 1,612,563 | 12/1926 | Bellis | 248/129 X |
| 2,446,518 | 8/1948 | Arnold et al. | 280/79.3 X |
| 3,155,364 | 11/1964 | Berg | 248/439 |

*Primary Examiner*—J. Franklin Foss

*Attorney, Agent, or Firm*—Burns, Doane, Swecker & Mathis

[57] ABSTRACT

A foldable support for a machine tool which is suitable for supporting tools such as a small size band saw comprises a base plate having different widths at each end. A pair of legs are pivotally mounted at each end of the base plate and are foldable thereunder. The first leg is narrower than the second leg so that they may be overlaid under the base plate to occupy a relatively small volume to facilitate transportation. A pair of extendible casters are mounted under the first leg and cooperate with a pair of foot wheels fixedly mounted under the second leg. The wheels permit easy and convenient movement of the support over short distances within the shop.

8 Claims, 5 Drawing Figures

FOLDABLE SUPPORT FOR MACHINE TOOL

FIELD OF INVENTION

The present invention relates generally a support for machine tools and more particularly to a foldable support for machine tools. The support which is suitable for supporting tools such as a small size band saw comprises a base plate having different width at two ends, a pair of legs being pivotally mounted respectively at each end of the base plate and foldable thereunder. The first leg is narrower than the second one so that they may be overlaid under the base plate when folded to occupy a small volume to facilitate transportation. A pair of extensible casters mounted under the first leg cooperate with a pair of foot wheels fixedly mounted under the second leg to provide a convenient moving of the support short distances within the shop.

BACKGROUND OF INVENTION

Most of the conventional supports for machine tools are of the fixed type, so that when packed for transportation they occupy a lot of precious space and result in high freight cost. In addition such supports rarely provide a means for facilitating movement of the support so that when short distance travelling within the shop is called for, other handling equipment has to be used. The present invention furnishes a novel design to improve the above drawbacks.

SUMMARY OF INVENTION

Therefore, the main object of the present invention is to provide a foldable support for machine tools comprising a base plate having different widths at each end, a pair of legs which are pivotally mounted at each end of the base plate and foldable thereunder. The legs may be overlaid one upon the other to reduce the volume of the support during transportation.

Another object of the present invention is to provide a foldable support for machine tools wherein a pair of extensible casters are installed under the first leg and cooperate with a pair of foot wheels fixedly mounted under the second leg for the convenience of moving the support short distances within the shop.

Still another object of the present invention is to provide a foldable support for machine tools wherein a small tool box is provided under the first leg for storage of small hand tools.

Other features and objects of the present invention will become apparent by way of the detailed description to be read with reference to the annexed drawings.

DETAIL DESCRIPTION OF EMBODIMENT

Figure 1:
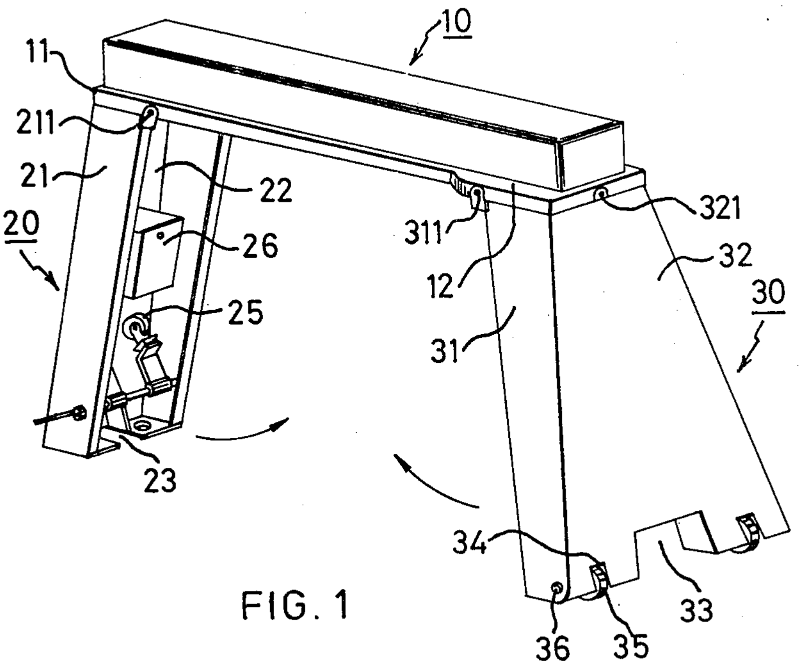
FIG. 1 is a perspective view showing a preferred embodiment of the foldable machine tool support of the present invention.
Figure 2:
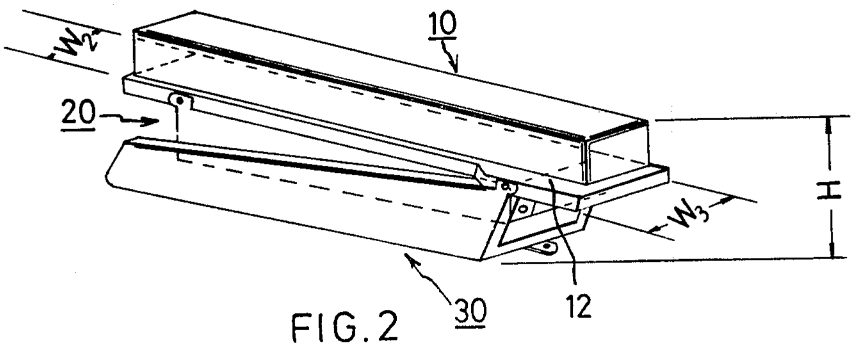
FIG. 2 is a perspective view of the preferred embodiment showing the pair of legs folded.
Figure 3:
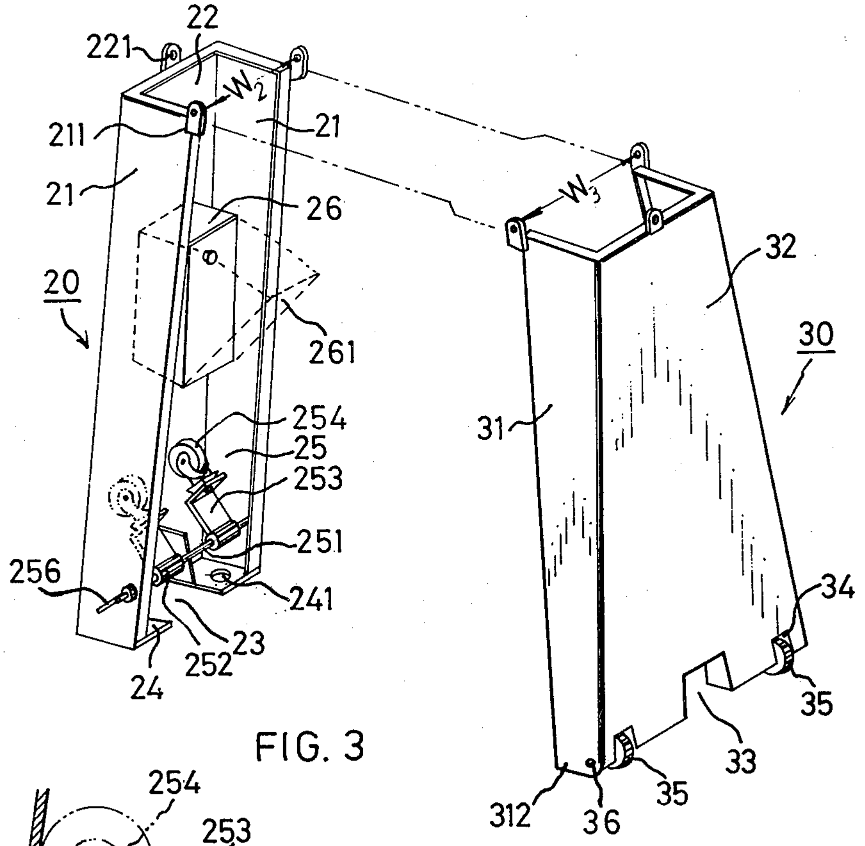
FIG. 3 is a perspective view showing the details of the legs.

With reference to FIGS. 1 to 3, the support for a machine tool of the present invention comprises a base plate 10 for supporting a machine tool such as a small size band saw (not shown). A first leg 20 and a second leg 30 are pivotally mounted at ends 11 and 12 of the base plate 10. From FIG. 2, it can be seen that when the legs are folded, the width $W_2$ of end 11 of the base plate 11 is narrower than width $W_3$ of end 12. In other words the width of the first leg 20 is narrower than the width of the second leg 30, so that when the legs are folded under the base plate 10, one overlaps the other to reduce the height H of the folded support to a minimum amount.

Figure 4:
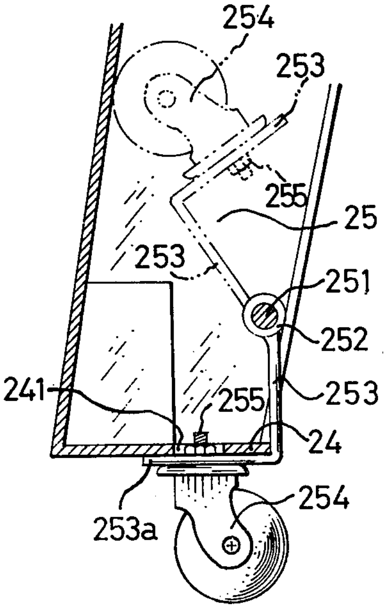
FIG. 4 is a partial cross sectional view in elevation showing the operation of the extensible casters.

FIG. 3 shows the detailed construction of legs 20 and 30, with the base plate 10 depicted by a dotted line. The first leg 20 has a generally U shaped cross section. On the top of the side walls 21—21 are pivoting lugs 211 which provide for pivoting of the leg. The end 11 of the base plate 10 has a width $W_2$ corresponding to the distance between lugs 211—211. On top of the end wall 22 of the leg 20 another lug 221 is disposed, so that when the leg 20 is unfolded, the lug 221 pushes against end 11 of the base plate 10 to provide better stability. If necessary, a set screw may be used to lock the lug 221 to the end 11 of the base plate 10. A recess 23 is provided under the first leg 20 and a footing plate 24 having a hole 241 in it is disposed at each side of the recess 23. Referring to FIG. 4, an extensible caster assembly 25 is provided under the first leg 20. Casters 254 are locked by a top bolt 255 on one arm of an L shaped member 253. The other arm of member 253 is provided with a pivotal sleeve 252 which is mounted on a pivot shaft 251 disposed between the lower part of the side walls 21—21 of the first leg 20. An operating handle 256 is provided at one end of the shaft 251 which projects out of the side wall 21 to extend or retract the pair of casters 25—25. In FIG. 4, the solid line shows the extended casters 25—25 under the first leg 20 while the dotted line depicts the retracted position. The top bolt 255 fits into the hole 241 within the footing plate 24.

As shown in FIG. 3, a relatively small tool box 26 with a lid 261 is provided under the structure of first leg 20 for storing small hand tools.

The details of the construction of the second leg 30 are also shown in FIG. 3. The second leg 30 also has a U shaped structure, with pivoting lugs 311—311 disposed on top of side walls 31—31. The distance $W_3$ between lugs 311—311 corresponds to the width $W_3$ of the end 12 of the base plate 10 to facilitate pivotal mounting of the second leg 30 under end 12. Another lug 321 which projects out of the top of one end wall 32 of the second leg 30 pushes against the end 12 of base plate 10 to provide for better stability. A set screw may be used to lock the lug 321 to the end 12 if necessary. A recess 33 is provided at the lower end of the leg 30 and two side recesses 34—34 are provided for mounting a pair of fixed foot wheels 35—35.

Figure 5:
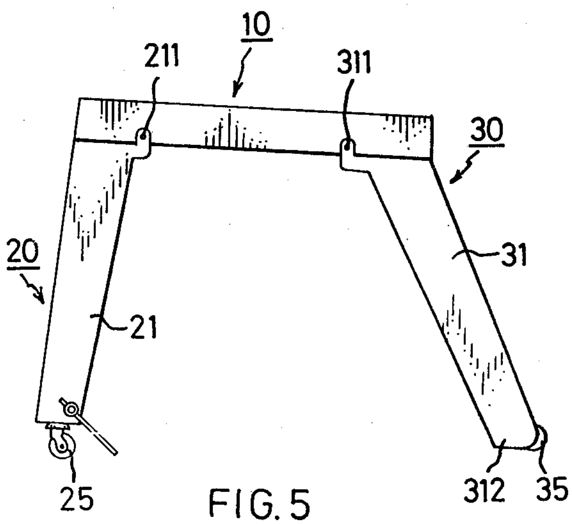
FIG. 5 is a front elevation showing the casters under one leg being extended to cooperate with the foot wheels under another leg to provide for movement of the support.

In FIG. 3, the inner corners 312—312 of side walls 31—31 of the second leg 30 are rested against the floor when the casters 25—25 of the first leg 20 are in the retracted position. In FIG. 5, the casters 25—25 are extended and the inner corners 312—312 of side wall of the second leg 30 are lifted from the floor, so that foot wheels 35—35 cooperate with the casters 25—25 and are able to be used for moving the support.

The above embodiment is given only for illustration purpose and not by way of limitation, and modifications will become evident to those skilled in the art which will fall within the scope of attached claims.

I claim:

1. A foldable support for a machine tool comprising:

a base plate having a first width at a first end of the plate narrower than a second width at a second end of the plate;

a first leg having a third width at one end corresponding to the first width of said first end of the base plate and pivotably mounted at said one end of the first leg to said first end for folding thereunder;

a second leg having a fourth width at one end corresponding to the second width of said second end of the base plate and pivotably mounted at said one end of the second leg to said second end for folding thereunder;

said second leg being substantially U-shaped in cross section, thereby providing for an interleaving of the legs with the first leg substantially within the second leg when the legs are in a folded condition;

a pair of wheels fixedly mounted under said second leg; and a pair of extensible casters mounted under said first leg;

wherein said pair of extensible casters and said pair of fixed wheels cooperate to permit rolling of said support when said extensible casters are in an extended position.

2. A foldable support for a machine tool according to claim 1 wherein recesses are provided under the second leg to accomodate mounting shafts extending from the side walls of the leg for carrying said wheels.

3. A foldable support for a machine tool according to claim 1 wherein a small size tool box for storing small hand tools is built-in under the structure of the said first leg.

4. The foldable support for a machine tool according to claim 1 wherein both of said first and second legs include pivoting lugs disposed at the top portions of side walls of said legs for pivotably attaching said legs to said base plate and also include a fixed lug disposed at the end wall of each of said legs for stabilizing each of the legs when in an unfolded position.

5. The foldable support for a machine tool according to claim 4 wherein said fixed lug of each leg is provided with a set screw for releasably attaching the lug to the base plate.

6. The foldable support for a machine tool according to claim 1 wherein both of said first and second legs are provided with recesses for accommodating said pairs of casters and wheels.

7. The foldable support for a machine tool according to claim 1 wherein the pair of wheels fixedly mounted under the second leg are arranged so that the pair of wheels are spaced above ground when the extensible casters are withdrawn and the pair of wheels contact the ground when the extensible casters are extended.

8. A foldable support for a machine tool comprising:

a base plate having a width at a first end narrower than the width at a second end;

a first leg having a width at one end corresponding to the width of said first end of the base plate and pivotably mounted at said one end of the first leg to said first end for folding thereunder;

a second leg having a width at one end corresponding to the width of the second end of the base plate and pivotably mounted at said one end of the second leg to the second end for folding thereunder;

said first and second legs being substantially U-shaped in cross-section, thereby providing for an interleaving of the legs when in a folded condition;

a pair of wheels fixedly mounted under said second leg;

a pair of extensible casters carried on an L-shaped member, said L-shaped member being disposed under said first leg and each of said casters being secured to said L-shaped member by a bolt;

said fixed wheels and said pair of extensible casters providing for rolling of said support when said pair of casters are in an extended position;

said L-shaped member being pivotably mounted between the side walls of said first leg and having a handle projecting from one of said side walls;

a plate mounted at a bottom portion of said first leg; and apertures in said base plate for receiving each of said bolts which secures said casters to said L-shaped member;

whereupon pivoting of said handle to extend said casters causes said bolts to be received by said apertures, thereby locking said casters in an extended position.

* * * * *